United States Patent
Ormesher et al.

(10) Patent No.: US 7,460,059 B1
(45) Date of Patent: Dec. 2, 2008

(54) REMOVING INTERFERING CLUTTER ASSOCIATED WITH RADAR PULSES THAT AN AIRBORNE RADAR RECEIVES FROM A RADAR TRANSPONDER

(75) Inventors: Richard C. Ormesher, Albuquerque, NM (US); Robert M. Axline, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 11/586,465

(22) Filed: Oct. 25, 2006

(51) Int. Cl.
*G01S 7/292* (2006.01)
*G01S 7/285* (2006.01)
*G01S 13/74* (2006.01)
*G01S 13/00* (2006.01)

(52) U.S. Cl. .................. 342/159; 342/25 R; 342/42; 342/43; 342/50; 342/51; 342/52; 342/58; 342/60; 342/160; 342/161; 342/162; 342/175; 342/195; 342/196; 375/316; 375/346; 375/350

(58) Field of Classification Search ......... 342/159–164, 342/175, 194–197, 25 R–25 F, 29–51, 89, 342/52, 57, 58, 60, 94–97, 165, 173, 378–384; 375/334–337, 316, 340–343, 346–351; 340/572.1–572.9, 340/551, 552, 505
See application file for complete search history.

(56) References Cited

U.S. PATENT DOCUMENTS

| | | | | |
|---|---|---|---|---|
| 3,863,244 | A | * | 1/1975 | Lichtblau ............... 340/572.3 |
| 4,168,496 | A | * | 9/1979 | Lichtblau ............... 340/572.4 |
| 4,535,323 | A | * | 8/1985 | Eccleston ............... 340/572.4 |
| 4,854,113 | A | * | 8/1989 | Strosser et al. ......... 340/572.4 |
| 5,432,517 | A | * | 7/1995 | Billaud et al. ............. 342/40 |
| 5,486,830 | A | | 1/1996 | Axline et al. |
| 5,576,693 | A | * | 11/1996 | Tyren et al. ............. 340/572.4 |
| 5,729,576 | A | * | 3/1998 | Stone et al. ............... 375/334 |
| 6,100,840 | A | | 8/2000 | Zidek et al. |
| 6,249,229 | B1 | * | 6/2001 | Eckstein et al. ......... 340/572.4 |
| 6,351,216 | B1 | * | 2/2002 | Frederick et al. ....... 340/572.4 |
| 6,577,266 | B1 | | 6/2003 | Axline |
| 7,030,805 | B2 | | 4/2006 | Ormesher et al. |

OTHER PUBLICATIONS

"Phase-Coded Tag with Synthetic Aperture Radar," Robert M. Axline, Jr., Sandia National Laboratories Memorandum, May 4, 1992.

* cited by examiner

*Primary Examiner*—Bernarr E Gregory
(74) *Attorney, Agent, or Firm*—Elmer A. Klavetter

(57) ABSTRACT

Interfering clutter in radar pulses received by an airborne radar system from a radar transponder can be suppressed by developing a representation of the incoming echo-voltage time-series that permits the clutter associated with predetermined parts of the time-series to be estimated. These estimates can be used to estimate and suppress the clutter associated with other parts of the time-series.

32 Claims, 3 Drawing Sheets

REMOVING INTERFERING CLUTTER ASSOCIATED WITH RADAR PULSES THAT AN AIRBORNE RADAR RECEIVES FROM A RADAR TRANSPONDER

This invention was developed under Contract DE-AC04-94AL85000 between Sandia Corporation and the U.S. Department of Energy. The U.S. Government has certain rights in this invention.

FIELD OF THE INVENTION

The invention relates generally to radar and rf tag technology and, more particularly, to clutter suppression in radar and rf tag operations.

BACKGROUND OF THE INVENTION

U.S. Pat. No. 5,486,830 and U.S. Pat. No. 6,577,266, both of which are incorporated herein by reference, describe in-band tag systems in detail. In such systems, a small, battery-powered, radio-frequency transponder, or "tag", receives radar pulses from a radar system carried on an aircraft or some other moving host platform. The tag modulates and amplifies the received pulses and transmits the modulated and amplified pulses back to the radar system. Such transmission of pulses from the tag back to the radar system is also referred to as the tag's echo. In some instances, the tag does not change the center frequencies of the received pulses when it transmits them back to the radar system. The radar system can interact with the tag in either a SAR (Synthetic Aperture Radar) or GMTI (Ground-Moving-Target-Indicator) mode. The radar and the tag are cooperable in various functional modes, including: (1) initial detection of the tag; (2) identification of the tag's type and specific identifying number or designation; (3) precise geo-location of the tag; and (4) communication of environmental and other valuable information, in digital form, from the tag to the radar. These modes are detailed in the aforementioned patents. The radar-responsive tags described above have many applications, including a variety of military and other U.S. government applications. In particular, they are applicable in areas such as situational awareness, combat ID, precision guidance and targeting, search and rescue, and friendly-fire incident mitigation.

During the above-described operation of the aforementioned radar tag technology, echoes from passive terrain return to the radar at about the same center frequencies as the tag's echoes, and at about the same times as the tag's echoes. These passive terrain echoes can thus interfere with the airborne radar's ability to detect the tag and decode data transmitted by the tag. This type of interference, also referred to as clutter, degrades the radar's ability to process the desired echoes coming from the tag One method to suppress clutter is to impart an inter-pulse (i.e., pulse-to-pulse) phase code to the tag's echo, as described in aforementioned U.S. Pat. No. 5,486,830. The receiving radar system applies 'azimuth' or 'Doppler' processing to the received pulses. This latter processing by the radar system forms a so-called pseudo-image of the tag. The tag's signature in the pseudo-image is enhanced due to a reduction in the amount of clutter power present in the processed signal. The clutter suppression factor can be on the order of 10 dB or more, depending upon the design details of the radar, its antenna, and the velocity at which the radar platform moves as the radar transmits and collects echo pulses from the terrain and from the tag or tags in the illuminated scene.

It is desirable in view of the foregoing to provide for improvements in the suppression of clutter in radar pulses received by a radar system from a radar transponder.

DETAILED DESCRIPTION

In the following description, the following notations are used interchangeably to denote a given matrix M having i rows and n columns: $\{M(i,n)\}$; $\{M\}$; and M.

In conventional radar systems, a raw echo-voltage time series is typically captured by an input stage, and a matrix $\{E(i,n)\}$ is produced to represent the captured time series. In $\{E(i,n)\}$, the row parameter, i=1, 2, ..., $N_r$, indexes the fast-time, or range, dimension, and the column parameter, n=1, 2, ..., $N_a$, indexes the azimuth dimension, or equivalently, the radar pulse number. The matrix E is complex in the sense that it possesses both real and imaginary signal channels. The real channel is also referred to as the in-phase (or I) channel, and the imaginary channel is also referred to as the quadrature (or Q) channel. The matrix E is available for subsequent processing by the conventional radar system, for example, SAR-image processing or GMTI processing.

Exemplary embodiments of the invention produce a matrix $\{E1(i,n)\}$, and use it for subsequent processing instead of $\{E(i,n)\}$. In the matrix E1, the representations of the tag's echo pulses in are arranged in a time series that is suitable for clutter suppression. Some embodiments produce the matrix $\{E1(i,n)\}$ such that every other azimuth column represents echoes from both tag information and clutter, and the remaining azimuth columns represent echoes from clutter only. For example, the first column of $\{E1\}$ and all other odd-number columns of $\{E1\}$ could represent only clutter energy, and the even-numbered columns of $\{E1\}$ could represent both tag information and clutter energy. With the matrix E1 so constructed, exemplary embodiments of the invention perform clutter cancellation as described below, and as illustrated with respect to FIGS. 1-3. The terms cancellation and suppression are used interchangeably herein in reference to a removal of clutter echoes associated with a received radar pulse.

Figure 1:
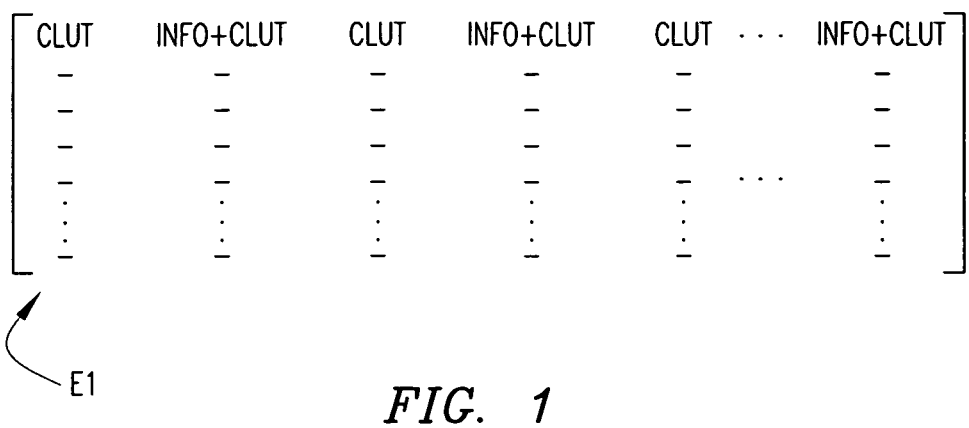
FIG. 1 illustrates an echo-voltage time series matrix utilized by a radar system according to exemplary embodiments of the invention.

Once the matrix E1 is constructed with odd-numbered columns representing clutter energy only, designated as CLUT in FIG. 1, and with even-numbered columns representing tag information energy plus clutter energy, designated as INFO+CLUT in FIG. 1, some embodiments perform range-dimension processing (commonly called range compression)

with respect to E1. This is achieved in some embodiments by performing matched-filter processing on each of the columns in E1, in order to transform each column from a set of fast-time video samples to a set of range-bin samples. Such range-compression processing is well known in the art. The result of the range-compression processing is then a new matrix denoted as $\{Z(p,n)\}$ where $p=1, 2, \ldots, N_f$ and $n=1, 2, \ldots, N_a$. The row parameter p indexes range bins, and as before, the column parameter n indexes radar pulses.

Once the aforementioned range-compressed matrix $\{Z\}$ has been obtained, the odd-numbered columns of Z can be used to form a new matrix $\{C\}$ and the even-numbered columns of Z can be used to form a new matrix $\{T\}$. Therefore, and assuming without loss of generality that $N_a$ is even, $$\{C(p,q)\}=\{Z(p,2q-1)\}, p=1, 2, \ldots, N_f \text{ and } q=1, 2, \ldots, N_a/2, \quad (1)$$

and $$\{T(p,q)\}=\{Z(p,2q)\}, p=1, 2, \ldots, N_f \text{ and } q=1, 2, \ldots, N_a/2. \quad (2)$$

Due to the above-described construction of $\{E1\}$, it can be seen that the matrix $\{C\}$ represents echoes that contain only clutter (or very nearly so), and the matrix $\{T\}$ represents echoes that contain both tag information and clutter. (Of course, both $\{C\}$ and $\{T\}$ also contain ever-present thermal noise.)

Two SAR/Tag images can then be formed, one based on $\{C\}$ and another based on $\{T\}$. Conventional image-formation processing commonly involves performing azimuth processing (also referred to as Doppler processing, as mentioned above) on a range-compressed image. Various embodiments of the invention use various schemes of azimuth processing, depending upon parameters such as desired range and azimuth resolution, and the radar operating frequency. As an example, some embodiments use a Fast Fourier Transform (FFT) to implement azimuth processing. Therefore, the images produced by such embodiments can be written as $$\{\Phi\}=\text{FFT}_{az}(\{C\}), \quad (3)$$

and $$\{\Gamma\}=\text{FFT}_{az}(\{T\}). \quad (4)$$

In both (3) and (4), the subscript 'az' indicates that the FFT is a one-dimensional operation executed with respect to the azimuth dimension (i.e., across each separate row) of the matrices $\{C\}$ and $\{T\}$.

Having produced the "clutter-only" image matrix $\{\Phi\}$, and the "tag information-plus-clutter" image matrix $\{\Gamma\}$, and recalling that each column of $\{\Gamma\}$ is associated with the radar pulse that immediately followed the radar pulse associated with the corresponding column of $\{\Phi\}$, exemplary embodiments of the invention use the "clutter-only" content in the columns of $\{\Phi\}$ as an approximation of the clutter that is present in the "tag information-plus-clutter" content in the corresponding columns of $\{\Gamma\}$. Some embodiments improve this approximation by adjusting $\{\Phi\}$ such that the pixels thereof have approximately the same electrical phase as the clutter components of the respectively corresponding pixels in $\{\Gamma\}$.

Figure 2:
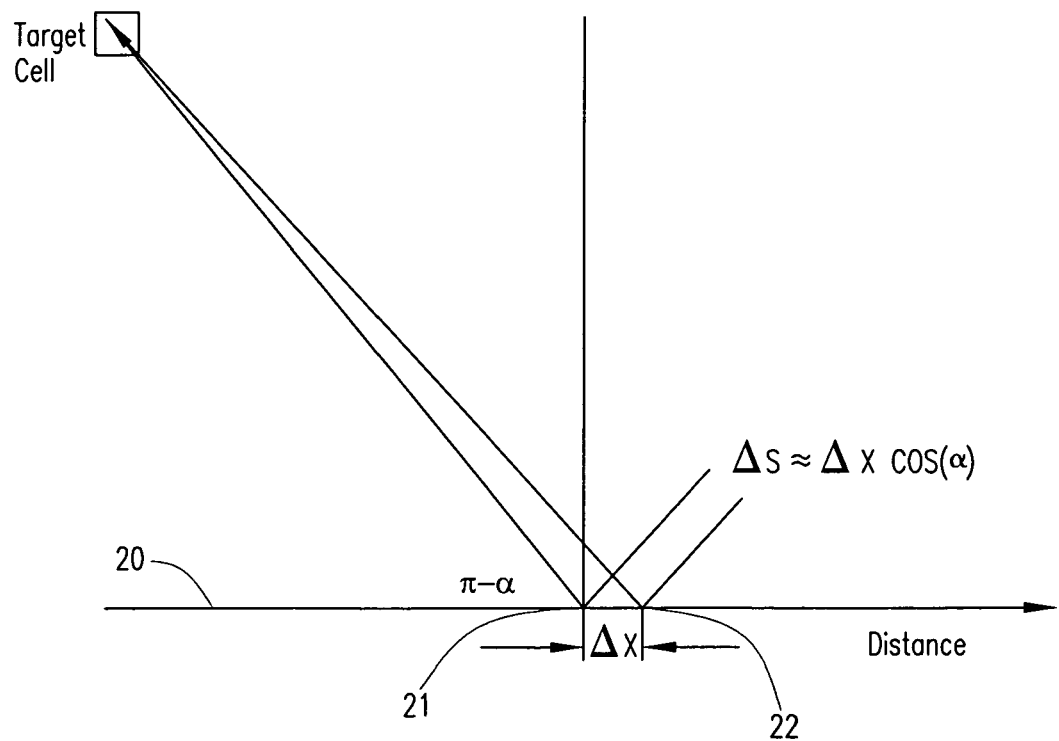
FIG. 2 graphically illustrates flight-path geometry used to estimate a phase adjustment according to exemplary embodiments of the invention.

Considering the aforementioned adjustment of $\{\Phi\}$ in more detail, it is initially noted that a conventional SAR or GMTI radar (and any tag cooperating with that radar) transmits pulses at a nearly constant pulse repetition interval (PRI), which is expressed in units of time. Some SAR systems adjust the PRI on a pulse-to-pulse basis in an attempt to make constant the distance $\Delta x$ traversed by the radar along its trajectory in one PRI. FIG. 2 diagrammatically illustrates an example of this geometry (although not to scale). The trajectory of the radar system, designated at 20, defines the distance axis in FIG. 2. Continuing with the exemplary construction of E1 described above, if location 21 on the radar system trajectory corresponds to the Rth column of matrix E1, where R is an odd integer, then location 22 corresponds to the (R+1)th column of matrix E1. This means that locations 21 and 22 respectively correspond to like-numbered columns of C and T, and thus also respectively correspond to like-numbered columns of the image matrices $\{\Phi\}$ and $\{\Gamma\}$. If the position of the target cell (which is associated with the tag) in the two images $\{\Phi\}$ and $\{\Gamma\}$ is at a relatively large distance from the radar trajectory 20, then a two-way radian phase difference $\kappa$ of the same pixel (captured at both locations 21 and 22) in the two images can be approximated as $$\kappa = 4\pi\Delta s/\lambda = 4\pi\Delta x \cos(\alpha)/\lambda. \quad (5a)$$

Examining equation (5a), it can be seen that as the angle $\alpha$ varies from 0 to $\pi$ (the only values of interest if imaging is implemented on only one side of the aircraft), the two-way phase difference $\kappa$ varies between its most-positive value, $4\pi\Delta x/\lambda$, and its most negative value, $-4\pi\Delta x/\lambda$.

Note that each of the Fourier transform operations of (3) and (4) produces $N_a/2$ complex Doppler-bin values that are indexed by an integer index, say k. The assignment of indices to Doppler bins is somewhat arbitrary; however, it is convenient here to make a particular assignment that simplifies the description of subsequent processing. The Discrete Fourier Transform of a time-series signal, $x(n)$, can be defined as $$FT\{x(n)\}=X(k)=\Sigma\{x(n)\exp(-j2\pi kn/N)\} \text{ for } n=1, 2, \ldots N \text{ and } k=-(N-1)/2<k<(N-1)/2 \quad (5b)$$

where the summation is taken on the index n, and N is required to be an odd number. Using (5b) with (3) and (4), the index sequence $-(N_a/2-1)/2<k<(N_a/2-1)/2$ can be obtained. A phase-correction matrix $\{K\}$ can be defined for use in adjusting the "clutter-only" image matrix $\{\Phi\}$ so that the pixels of $\{\Phi\}$ have nearly the same electrical phase as the clutter components of the respectively corresponding pixels in the "tag information-plus-clutter" matrix $\{\Gamma\}$. In some embodiments, the adjustment is applied to $\Phi$ in pixel-by-pixel fashion (i.e., each pixel value of $\Phi$ is multiplied by the corresponding pixel value of K), as shown in (6a) below, to form a "phase-adjusted clutter-only" image matrix $\{\Omega\}$:

$$\Omega(p,k)=K(p,k)\Phi(p,k) \quad p=1, 2, \ldots, N_f \text{ and } k=1, 2, \ldots, N_a/2. \quad (6a)$$

Because each column of $\{T\}$ represents a PRI that immediately follows the PRI represented by the like-numbered column of $\{C\}$ then there is a ½ sample time delay between $\{C\}$ and $\{T\}$. Using the shifting theorem, $$FT\{x(n-\tau)\}=X(k)\exp(j2\pi(k/N)\tau) \quad (6b)$$

and setting $\tau=\frac{1}{2}$, the computation of $\{K\}$ is $$K(p,k)=\exp(-j\pi k/(N_a/2)). \quad (7)$$

Note, K(p,k) does not vary with the range index p in embodiments that use the formulation of (5a)-(7).

A "clutter-cancelled" image matrix $\{\delta\}$ can now be computed as shown in (8) below by subtracting the "phase-adjusted clutter-only" image matrix $\{\Omega\}$ from the "tag information-plus-clutter" matrix $\{\Gamma\}$, on a pixel-by-pixel basis:

$$\delta(p,k)=\Gamma(p,k)-\Omega(p,k). \quad (8)$$

Figure 3:
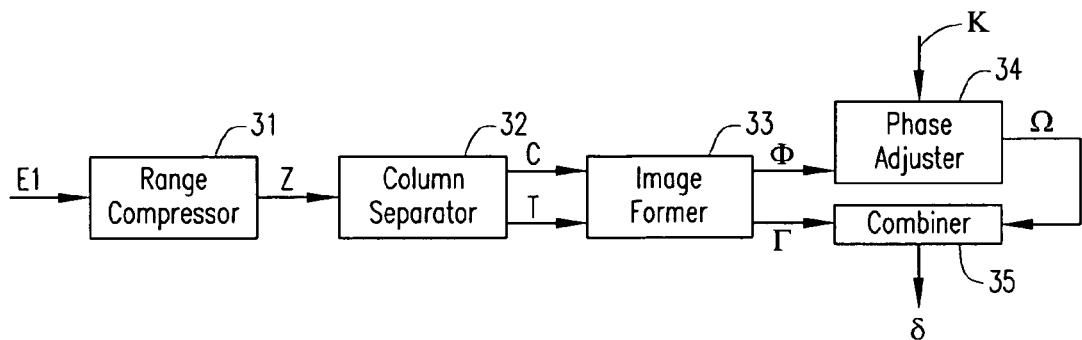
FIG. 3 diagrammatically illustrates a clutter-cancellation unit for use with a radar system according to exemplary embodiments of the invention.

FIG. 3 diagrammatically illustrates a clutter-cancellation unit for use with an imaging radar system according to exemplary embodiments of the invention. A range compressor 31 performs range compression with respect to E1, thereby producing the aforementioned matrix Z. A column separator 32 separates the columns of Z according to (1) and (2) above to produce the aforementioned matrices C and T. An image former 33 receives C and T, and forms therefrom the respective image matrices {Φ} and {Γ}. In some embodiments, the image former unit 33 implements (3) and (4) above to produce {Φ} and {Γ}. A phase adjuster 34 implements (6a) above to apply an appropriate phase adjustment parameter (e.g., from K in (6a)) to {Φ}, thereby producing the "phase-adjusted clutter-only" image matrix {Ω}. The pixels in {Ω} serve as clutter-cancellation parameters for use in cancelling interfering clutter from {Γ}. A combiner 35 combines {Ω} and {Γ} according to (8) above to produce the "clutter-cancelled" image matrix {δ}.

The desired construction of matrix E1, for example as described above and shown in FIG. 1, can be achieved in any suitable manner. For example, in some embodiments, the tag transmits its echo response sequence only during alternate pulse repetition intervals (PRIs), beginning with the second interval, and continuing in subsequent even-numbered intervals of the aperture. The tag does not transmit in the remaining, odd-numbered intervals of the aperture. In some embodiments, the tag's echo response sequence exhibits the identical transmission protocol described in the aforementioned patents, but the aperture is twice as long, due to the tag's alternating intervals of transmission activity and transmission inactivity. This is well within the capabilities of the SAR/tag system described in the aforementioned patents.

Figure 4:
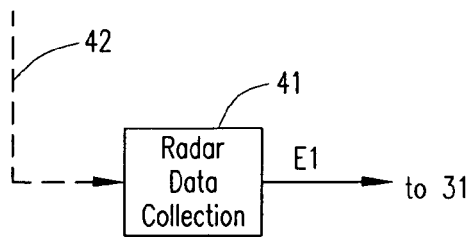
FIG. 4 diagrammatically illustrates radar data collection according to exemplary embodiments of the invention.

With the above-described alternating transmission approach, alternate pulse samples of radar signaling activity taken at the radar will exhibit only clutter, while the remainder of the pulse samples will contain tag information plus clutter. A conventional radar receiver will therefore automatically achieve the desired construction of the matrix E1 by simply performing data collection (e.g., SAR data collection) in conventional fashion. This is illustrated in FIG. 4, wherein the data collection portion 41 of a conventional airborne radar system produces the matrix E1 of FIG. 1 directly, by virtue of receiving the tag's above-described alternating transmission sequence (plus clutter) 42. The matrix E1 is provided to the range compressor 31 of FIG. 3. The alternating transmission sequence 42 lends itself well to operations in the detection, geo-location, and data uplink modes of the SAR/tag system described in the aforementioned patents.

In some embodiments, the informational content transmitted by the tag is arranged in the tag's echo response sequence in a manner that facilitates construction of the desired matrix E1 by the receiving radar system. Such embodiments are useful for the geo-location and data-uplink modes of the SAR/tag system described in the aforementioned patents. Some of these embodiments are designed to exploit the following exemplary set of tag operating conditions (although this set of conditions is not a necessary predicate to practicing the invention):

1. The tag employs 0/π phase-shift keying from pulse to pulse.
2. The tag employs a multi-pulse preamble, i.e., a sequence of preamble bits. The preamble is a well-known transmission control signal. It is conventionally provided by the tag described in the aforementioned patents, and is known a priori by the airborne radar system.
3. The tag sends multiple data bits, one per pulse. Data bits represent information; therefore, they are not known a priori by the airborne radar system.

Figure 5:
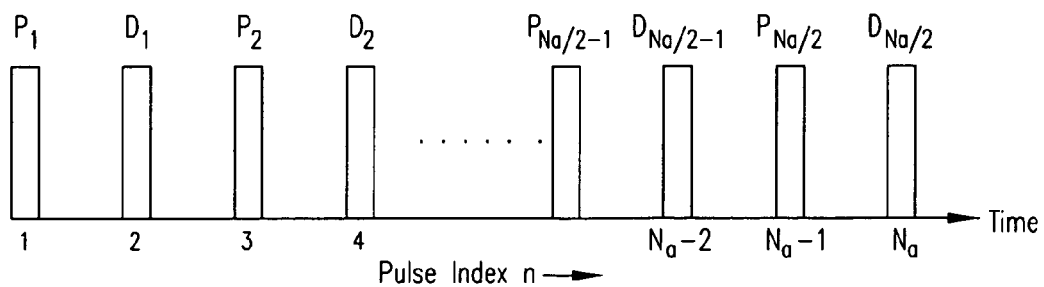
FIG. 5 is a timing diagram that illustrates a tag echo response sequence according to exemplary embodiments of the invention.

The tag's response pulses are arranged in the following manner according to exemplary embodiments of the invention. Odd-numbered pulses within the aperture are preamble pulses, and thus have preamble phase-code (bit) values. Even-numbered pulses within the aperture are data pulses, and thus have data phase-code (bit) values. FIG. 5 illustrates the sequence of tag response pulses, versus the pulse index n, according to some embodiments.

Figure 6:
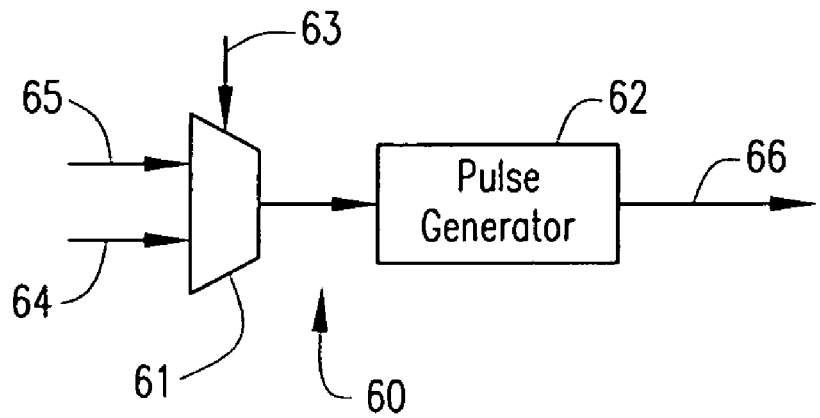
FIG. 6 diagrammatically illustrates a tag that is capable of producing the echo response sequence of FIG. 5 according to exemplary embodiments of the invention.

FIG. 6 diagrammatically illustrates pertinent portions of a tag that can produce the sequence of pulses shown in FIG. 5 according to exemplary embodiments of the invention. The tag of FIG. 6 includes a pulse production unit 60 that contains a selector 61 and a pulse generator 62. The selector 61 is responsive to a timing control signal 63 for selecting preamble bits 64 and data (i.e., substantive information) bits 65 in alternating fashion for transmission. The bit that is currently selected by selector 61 is provided to the pulse generator 62. For each bit received from the selector 61, the pulse generator 62 uses conventional techniques to generate a corresponding radar pulse at 66 for transmission to the airborne radar system.

In some embodiments, the following operations are implemented to construct the desired matrix {E1}. First, raw echo pulses containing preamble bits are processed. As indicated above, the values of the preamble bits are known to the radar. This preamble processing, which is described in the aforementioned patents, provides an estimate of the range and azimuth coordinates of the tag (i.e., an estimate of the tag's location on the radar image or map). The preamble processing, particularly the process of detecting the tag's location, provides an accurate estimate of the amplitude and electrical phase of the tag's response.

Knowing the preamble bit sequence, and having also produced amplitude and phase estimates associated with the tag's response, the radar system has sufficient information to estimate the complex signal voltages attributable to the preamble bits sent by the tag. The radar system can therefore suitably process the preamble pulses to remove these estimated complex signal voltages from the preamble pulses. For any given preamble pulse, the voltage that remains after this removal process is a good estimate of the complex clutter (plus thermal noise) voltage associated with the preamble pulse. This permits the radar system to produce the desired matrix E1 with odd-numbered columns containing "clutter-only" information, and even-numbered columns containing "tag information-plus-clutter". In some embodiments, the aforementioned removal process is implemented by coherent subtraction.

Figure 7:
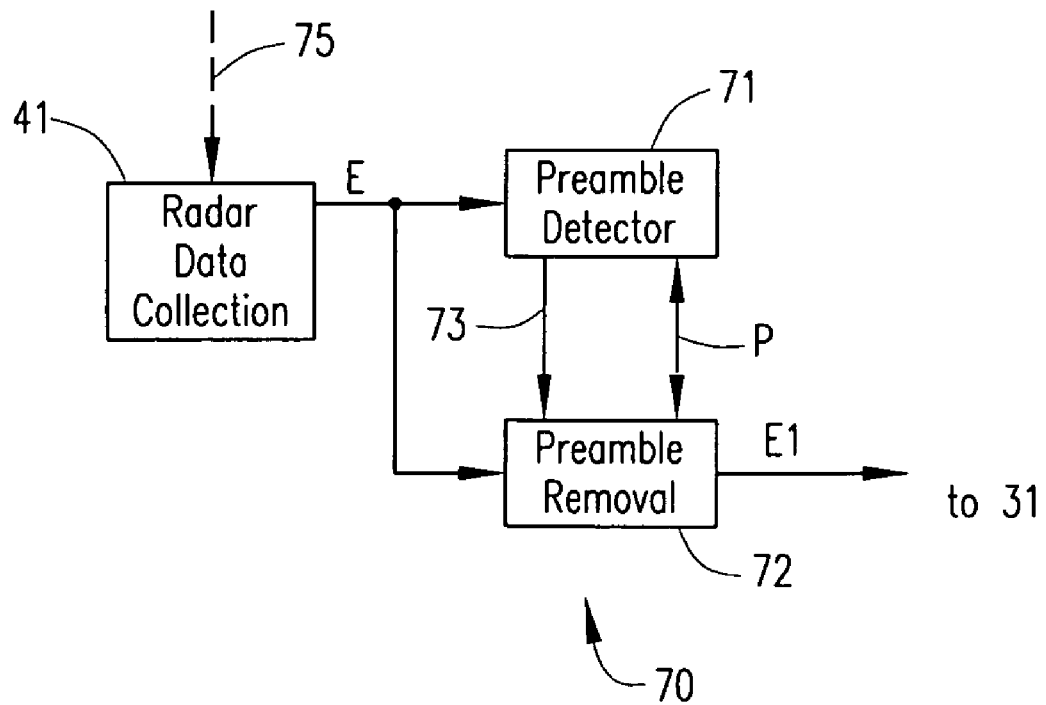
FIG. 7 diagrammatically illustrates a clutter estimator according to exemplary embodiments of the invention.

FIG. 7 diagrammatically illustrates a clutter estimator for use with a radar system according to exemplary embodiments of the invention. In some embodiments, the clutter estimator 70 is capable of constructing the desired matrix E1 in response to the exemplary tag echo sequence shown in FIG. 5. The clutter estimator 70 includes a preamble detector 71, a preamble removal unit 72 and a radar data collection apparatus 41 (see also FIG. 4). Using the tag echo sequence of FIG. 5 as an example, the data collection apparatus 41 receives the incoming sequence (with clutter and noise) 75, and uses conventional techniques to produce a corresponding matrix E. The preamble detector 71 uses conventional preamble processing techniques to detect the preamble information contained in E, based on the known preamble pattern, designated as P in FIG. 7. As mentioned above, the preamble processing also produces an estimate 73 of the amplitude and electrical phase of the tag's echo.

The preamble removal unit 72 uses the known preamble pattern P and the amplitude and phase estimate information 73 to remove from the preamble information (contained in E) an estimate of the complex signal voltage attributable to the preamble pulses sent by the tag. This removal operation leaves, in place of the preamble information, residual information representing estimates of the clutter associated with the preamble pulses. The preamble removal process thus produces the desired matrix E1 of FIG. 1, which is in turn provided to the range compressor 31 of FIG. 3.

Referring again to the clutter-cancelled image matrix $\{\delta\}$ of (8) and FIG. 3, this matrix is useful in a variety of contexts, some examples of which are described below. When performing initial detection of the tag, or geo-location of the tag, the clutter-cancelled image $\{\delta\}$ will provide a pseudo-image having a clutter power that is reduced beyond the reductions achieved by the aforementioned conventional pulse-to-pulse phase code technique. (In some embodiments, the clutter power reduction is on the order of 20 dB.) In situations where the tag has not placed a phase code on its echo, then the tag's signature will appear in the pseudo-image $\{\delta\}$ as an easily detectable bright coherent signature (a bright spot) with minor range and azimuth sidelobes. The location of the tag's signature in the pseudo-image can be used to compute an estimate of the tag's location. In situations where the tag's echo uses a pulse-to-pulse phase code that is known to the receiving radar, the image matrix $\{\delta\}$ can be processed as follows to focus the tag's signature in the pseudo-image:

1) perform a one-dimensional inverse FFT along the azimuth dimension of the pseudo-image $\{\delta\}$ to obtain a time-domain matrix that is range-compressed but not azimuth-compressed;

2) remove the known pulse-to-pulse phase code from the time-domain matrix; and 3) perform a forward FFT to return to the pseudo-image domain.

The resulting pseudo-image will contain a focused signature of the tag that is readily detectable.

In situations where the approximate location of the tag is known to the receiving radar, the tag sends phase-coded data that is unknown to the receiving radar. In this case, the clutter-cancelled pseudo-image matrix $\{\delta\}$ can be processed as follows:

1) perform an inverse FFT along the azimuth dimension of $\{\delta\}$ to produce a time domain matrix $\{F\}=FFT^{-1}_{az}(\{\delta\})$; and 2) apply a range-azimuth data track loop to the rows of $\{F\}$ to extract the uplink data coming from the tag to the radar.

When using the embodiments of FIG. 4, the preamble information is still present in the time domain matrix $\{F\}$, so preamble detection is required before the data can be extracted. On the other hand, when using the embodiments of FIG. 7, the preamble is removed by the clutter estimator 72, and therefore is not present in the time domain matrix $\{F\}$. In this case, the data can be extracted directly.

Although cancellation of clutter-type interference is described in the illustrative examples given above, workers in the art will recognize that the techniques described herein are broadly applicable to the cancellation of interfering energy in general.

Although exemplary embodiments of the invention have been described above in detail, this does not limit the scope of the invention, which can be practiced in a variety of embodiments.

What is claimed is:

1. A pulsed radar reception method, comprising:
receiving at a moving platform pulsed radar signaling activity including a plurality of information pulses respectively associated with a first plurality of intervals of active transmission by a radar transponder, said pulsed radar signaling activity further including a plurality of pulse samples respectively associated with a second plurality of intervals in which the radar transponder is inactive with respect to transmission, each of said information pulses having associated therewith a respectively corresponding one of said pulse samples that bears a predetermined temporal relationship relative to the information pulse; and
for each of said information pulses, canceling interference associated with the information pulse based on the respectively corresponding pulse sample and the associated temporal relationship.

2. The method of claim 1, wherein said canceling includes producing an interference cancellation parameter based on the temporal relationship and the pulse sample.

3. The method of claim 2, wherein said producing includes combining a phase adjustment parameter with information associated with the pulse sample to produce the interference cancellation parameter, and wherein the phase adjustment parameter corresponds to the temporal relationship.

4. The method of claim 3, wherein said canceling includes combining the interference cancellation parameter with information associated with the information pulse to cancel interference associated with the information pulse.

5. The method of claim 1, wherein all of said pulse samples bear a common temporal relationship relative to the respectively corresponding information pulses.

6. The method of claim 5, wherein said pulse samples and said information pulses are interleaved in a temporally alternating sequence.

7. A pulsed radar receiver apparatus for operation on a moving platform, comprising:
an input for receiving pulsed radar signaling activity including a plurality of information pulses respectively associated with a first plurality of intervals of active transmission by a radar transponder, said pulsed radar signaling activity further including a plurality of pulse samples respectively associated with a plurality of intervals in which the radar transponder is inactive with respect to transmission, each of said information pulses having associated therewith a respectively corresponding one of said pulse samples that bears a predetermined temporal relationship relative to said information pulse; and
an interference cancellation unit coupled to said input, said interference cancellation unit operable with respect to each of said information pulses for canceling interference associated with the information pulse based on the respectively corresponding pulse sample and the associated temporal relationship.

8. The apparatus of claim 7, wherein said interference cancellation unit is configured to produce for each of said information pulses an interference cancellation parameter based on the associated temporal relationship and the corresponding pulse sample.

9. The apparatus of claim 8, wherein said interference cancellation unit is operable with respect to each of said information pulses to combine a phase adjustment parameter with information associated with the corresponding pulse sample to produce the associated interference cancellation parameter, and wherein the phase adjustment parameter corresponds to the associated temporal relationship.

10. The apparatus of claim 9, wherein said cancellation unit is operable with respect to each of said information pulses to combine the associated interference cancellation parameter with information associated with the information pulse to cancel interference associated with the information pulse.

11. A pulsed radar reception method, comprising:
receiving at a moving platform a temporal sequence of radar pulses respectively associated with intervals of transmission by a radar transponder, said temporal sequence of radar pulses including a plurality of information pulses and a plurality of transmission control pulses, each of said information pulses having associated therewith a respectively corresponding one of said transmission control pulses that bears a predetermined temporal relationship relative to the information pulse; and
for each of said information pulses, canceling interference associated with the information pulse based on the respectively corresponding transmission control pulse and the associated temporal relationship.

12. The method of claim 11, wherein each of said transmission control pulses has associated therewith an informational component imparted thereto by the radar transponder during the associated interval of transmission, and wherein said canceling includes providing an estimate of an interference component associated with the transmission control pulse based on information indicative of the informational component associated with the transmission control pulse.

13. The method of claim 12, wherein said providing includes estimating an electrical characteristic associated with the transmission control pulse, and wherein said information indicative of the informational component associated with the transmission control pulse includes the estimated electrical characteristic and a predetermined informational content associated with the transmission control pulse.

14. The method of claim 13, wherein said electrical characteristic includes one of phase and amplitude.

15. The method of claim 12, wherein said providing includes performing coherent subtraction to produce the interference component estimate.

16. The method of claim 12, wherein said canceling includes producing an interference cancellation parameter based on the temporal relationship and the interference component estimate.

17. The method of claim 16, wherein said producing includes combining a phase adjustment parameter with the interference component estimate to produce the interference cancellation parameter, and wherein the phase adjustment parameter corresponds to the temporal relationship.

18. The method of claim 16, wherein said canceling includes combining the interference cancellation parameter with information associated with the information pulse to cancel interference associated with the information pulse.

19. The method of claim 18, wherein all of said transmission control pulses bear a common temporal relationship relative to the respectively corresponding information pulses.

20. The method of claim 19, wherein said transmission control pulses and said information pulses are interleaved in temporally alternating fashion in said temporal sequence.

21. A pulsed radar receiver apparatus for operation on a moving platform, comprising:
an input for receiving a temporal sequence of radar pulses respectively associated with intervals of transmission by a radar transponder, said temporal sequence of radar pulses including a plurality of information pulses and a plurality of transmission control pulses, each of said information pulses having associated therewith a respectively corresponding one of said transmission control pulses that bears a predetermined temporal relationship relative to the information pulse; and
an interference canceller coupled to said input, said interference canceller operable with respect to each of said information pulses for canceling interference associated with the information pulse based on the respectively corresponding transmission control pulse and the associated temporal relationship.

22. The apparatus of claim 21, wherein each of said transmission control pulses has associated therewith an informational component imparted thereto by the radar transponder during the associated transmission interval, and wherein said interference canceller includes an interference estimator configured to provide for each of said transmission control pulses an estimate of an interference component associated with the transmission control pulse, based on information indicative of the informational component associated with the transmission control pulse.

23. The apparatus of claim 22, wherein said interference estimator is configured to provide for each of said transmission control pulses an estimate of an electrical characteristic associated with the transmission control pulse, and wherein said information indicative of the informational component associated with the transmission control pulse includes said estimated electrical characteristic and a predetermined informational content associated with the transmission control pulse.

24. The apparatus of claim 22, wherein said interference estimator is operable with respect to each of said information pulses to perform coherent subtraction to produce the associated interference component estimate.

25. The apparatus of claim 22, wherein said interference canceller includes a cancellation unit coupled to said interference estimator and configured to produce for each of said information pulses an interference cancellation parameter based on the associated temporal relationship and the associated interference component estimate.

26. The apparatus of claim 25, wherein said cancellation unit is operable with respect to each of said information pulses to combine a phase adjustment parameter with the associated interference component estimate to produce the associated interference cancellation parameter, and wherein the phase adjustment parameter corresponds to the associated temporal relationship.

27. The apparatus of claim 25, wherein said cancellation unit is operable with respect to each of said information pulses to combine the associated interference cancellation parameter with information associated with the information pulse to cancel interference associated with the information pulse.

28. The apparatus of claim 21, wherein said interference includes clutter.

29. A method of producing a pulsed radar signal for transmission from a radar transponder to a moving radar receiver, comprising:
providing in the pulsed radar signal a temporal sequence of radar pulses including a plurality of information pulses and a plurality of transmission control pulses; and providing for each of said information pulses a respectively corresponding one of said transmission control pulses that bears a predetermined temporal relationship relative to the information pulse and which is used by the radar receiver, together with said predetermined temporal relationship, to cancel interference associated with the information pulse.

30. The method of claim 29, wherein all of said transmission control pulses bear a common temporal relationship relative to the respectively corresponding information pulses.

31. The method of claim 30, wherein said transmission control pulses and said information pulses are interleaved in temporally alternating fashion in said temporal sequence.

32. A radar transponder apparatus for transmitting a pulsed radar signal to a moving radar receiver, comprising:

an output for transmitting the pulsed radar signal; and a pulse production unit coupled to said output for providing in the pulsed radar signal a temporal sequence of radar pulses including a plurality of information pulses and a plurality of transmission control pulses, said pulse production unit configured to provide for each of said information pulses a respectively corresponding one of said transmission control pulses that bears a predetermined temporal relationship relative to the information pulse and which is used by the radar receiver, together with said predetermined temporal relationship, to cancel interference associated with the information pulse.

* * * * *